Figure 1:
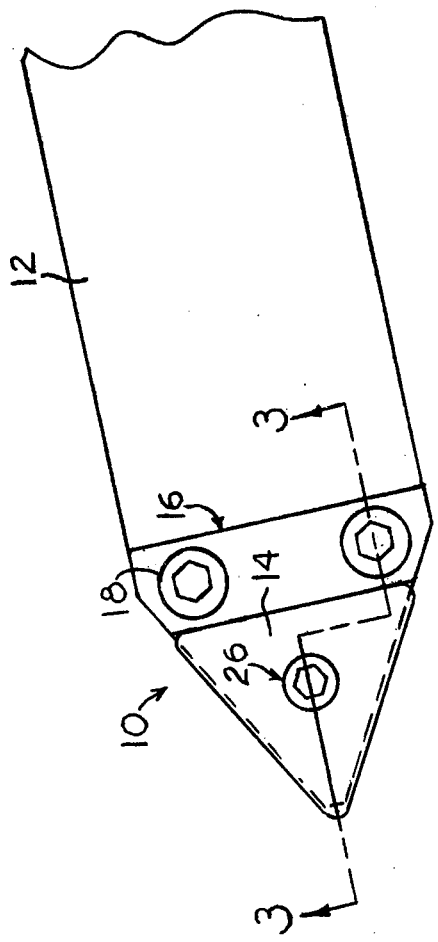

United States Patent [19]

Barnes

[11] 4,016,634
[45] Apr. 12, 1977

[54] INDEXABLE INSERT TYPE CUTTING TOOLHOLDERS

[75] Inventor: William E. Barnes, Mount Clemens, Mich.

[73] Assignee: Empire Tool Company, Memphis, Mich.

[22] Filed: Apr. 19, 1976

[21] Appl. No.: 678,111

[52] U.S. Cl. .................................................. 29/96
[51] Int. Cl.² ........................................... B26D 1/00
[58] Field of Search .......................... 29/96, 97, 98

[56] References Cited

UNITED STATES PATENTS

| | | | |
|---|---|---|---|
| 2,883,737 | 4/1959 | Wilson | 29/96 |
| 3,102,326 | 9/1963 | Conti et al. | 29/96 |
| 3,136,031 | 6/1964 | Cassidy | 29/97 |
| 3,246,382 | 4/1966 | Zierden | 29/96 |
| 3,299,491 | 1/1967 | Hall | 29/96 |
| 3,341,920 | 9/1967 | Kelm | 29/96 |
| 3,341,921 | 9/1967 | Weller et al. | 29/96 |
| 3,376,763 | 4/1968 | Welles | 29/96 X |
| 3,533,150 | 10/1970 | Welch | 29/96 |
| 3,540,102 | 11/1970 | Yogus et al. | 29/96 |
| 3,854,183 | 12/1974 | Roos | 29/96 |

Primary Examiner—Harrison L. Hinson
Attorney, Agent, or Firm—Cullen, Settle, Sloman & Cantor

[57] ABSTRACT

Improvement in indexable insert type cutting toolholder having a steel shank and a pocket in the shank for carrying an indexable insert therein, the insert having a central aperture therein by which it is held in place in the toolholder, the improvement comprising a cartridge fitted in the pocket in the shank, an arrangement for fastening the cartridge securely in place in the shank pocket, the cartridge formed of a high speed steel harder than that of the shank but less that that of the insert, the cartridge retaining its hardness even when heated to cherry red heat, the cartridge having a pocket therein for holding the insert, and an arrangement for fastening the insert securely in place in the cartridge pocket.

2 Claims, 3 Drawing Figures

INDEXABLE INSERT TYPE CUTTING TOOLHOLDERS

My invention relates to indexable insert type cutting tools.

Present day cutting tools of this type hold the insert (which is most always a carbide insert; sometimes a ceramic insert is used) and a shim beneath the insert in a pocket in the shank of the toolholder. As best known to applicant, there are about sixteen companies presently supplying such cutting tools and all use a loose carbide shim beneath the carbide insert. The insert has a central aperture therein and a threaded lock pin is employed to hold the insert in said pocket but said lock pin has poor holding power and is easily sheared because of the long distance between the pressure point and fulcrum thereon. Said shim in the case of a carbide insert is made of carbide and hence is nearly as expensive as the insert itself. It is also thinner and weaker than said insert and is not directly fastened to the shank. Both the shim and insert are brittle and break easily causing damage to said shank. Said shank is only semi-hard and easily nicked or dented which aggravates the problem of improper insert seating. In many cases the loose thin shim causes the insert itself to loosen and hence the entire cutting tool to chatter. Erosion of the front end of the shank and eventual complete collapse of the tool is a commonplace event with present cutting tools.

The principal object of my invention is to provide improvements in a toolholder of the type indicated which overcome the foregoing disadvantages and extend the useful life of said tool-holder and of the inserts used therewith.

Figure 3:
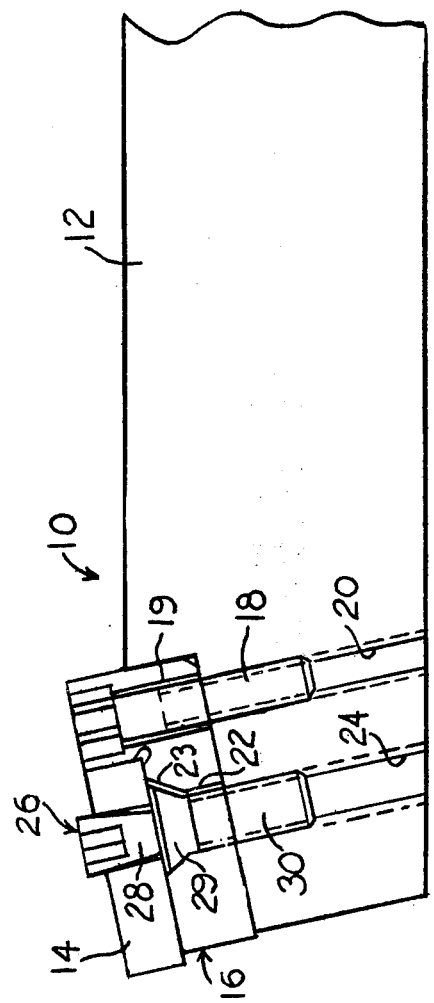
Figure 2:
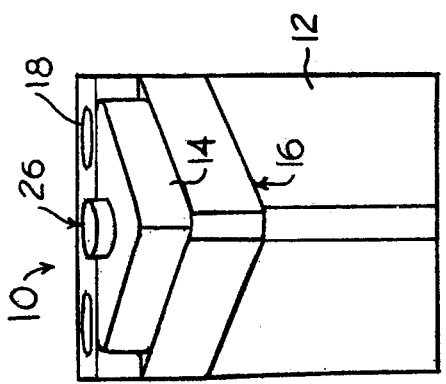

The foregoing object of my invention and the advantages thereof will become apparent during the course of the following description, taken in conjunction with the accompanying drawings, in which:

FIGS. 1, 2 and 3 are, respectively, top plan, front and side elevational views of an indexable insert type toolholder embodying my invention.

Referring to the drawings in greater detail, 10 generally designates said embodiment of cutting toolholder which comprises a shank 12 having a pocket in the upper front end thereof which has a bottom surface or floor machined at a predetermined rake angle in respect to a reference plane on said shank 12 such as the top or bottom surface thereof. A cartridge 16 is held in said pocket by fasteners 18 threadably engaged in threaded apertures 20 in said shank 12. Said cartridge is made of a very strong high speed steel which is tough and not liable to fracture under pressure. Such steel is a relatively high alloy steel containing chromium, nickel and cobalt and is known in the trade as high speed or M-2 steel. The term high speed steel is indicative of its property of retaining its hardness even when it becomes extremely hot at high speeds of cutting. It has a hardness in the range of 64–68 Rockwell C. Said cartridge is thus harder than that of said shank (about 40 Rockwell C) but less hard than the carbide of said insert (about 90–94 Rockwell C). Said cartridge, like said insert, retains its hardness even when heated to cherry red heat (between 1175° and 1375° F) and this is essential to the success of my toolholder. Said cartridge is almost twice as thick as the carbide shim used in present cutting tools. Said cartridge 16 offers a high degree of protection to the shank 12 even in the event of insert breakage. The cartridge 16 has a right-angled pocket therein which is defined by a bottom surface or floor and a back wall which upstands from said floor. Extending through the full height of said back wall are clearance apertures 19 which accommodate said fasteners 18. The heads of said fasteners 18 are disposed in countersink apertures for said clearance apertures 19. Said cartridge 16 has a further clearance aperture 22 therein which extends through the center of said floor portion thereof. A conical countersink cavity 23 is provided above said clearance aperture 22 which is rearwardly offset in respect to the center of said aperture 22 for purposes which will be explained. The cartridge 16 receives in the pocket therein an indexable insert 14 of carbide (ceramic inserts have recently been introduced on the market with some success in cutting hardened steels in the range of 60–66 Rockwell C) which is held in place by a lock pin 26 threadably engaged in a threaded aperture 24 in said shank 12. The thickness of the floor portion of the cartridge 16 is about twice as thick as that of the loose shim in present day cutting tools. Said lock pin 26 has a tapered head 28, as shown, which extends through the central aperture in said insert 14 and also has a conical intermediate portion 29 which is disposed in the cavity 23. The taper on the head 28 is such that the same is widest at its top surface. As the lock pin 26 is tightened the same is forced rearwardly by reason of the rearward offset of said cavity 23 and the insert 14 in turn is forced both rearwardly against the back wall and downwardly against the floor of said cartridge 16 by the tapered head 28 of said lock pin 26. As viewed in FIG. 3 the resultant force from the tapered head 28 of the lock pin 26 acting upon the insert 14 is in a 45 degree downward angle toward the inside corner of the pocket in the cartridge 16 which is lengthwise cut out, as shown, to accommodate the corresponding corner of the insert 14. In present day cutting tools the resultant force acts straight rearwardly which results in the insert and shim beneath tending to slide upwardly at the rear of the pocket in the shank. The vertical distance between the pressure point on the head 28 of said lock pin against the insert 14 and the fulcrum point on the conical portion 29 against the cavity 23 is approximately equal to the height of the insert 14. This is about one-third to one-half of the corresponding distance in present day cutting tools which use a carbide shim beneath the insert. Under heavy cuts this difference is most significant when it is considered that in present day cutting tools the insert acts directly against a relatively soft shank while being insecurely supported by a loose and brittle carbide shim which itself is free to move in its pocket in the shank. On the other hand, in my invention the insert 14 acts against a hard and tough cartridge 16 which is solidly fastened in the shank 12.

In use of the cutting tool holder 10, the cartridge 16 is securely fastened in its pocket in the shank and an indexable insert 14 is inserted in the pocket in the cartridge 16 and held therein by tightening the lock pin 26. The cutting tool thus assembled is held in a suitable metal cutting machine by the shank 12 and a turning or facing or boring operation carried out on a workpiece. The highest front point on the insert 14 is employed for such cutting and when the same wears down the insert 14 is removed from the toolholder 10 without disturbing the cartridge 16 except to ascertain that the latter remains tightly fastened in place in its pocket in the shank 12. The insert 14 is then replaced in its pocket in the cartridge 16 in a new orientation with a fresh point in the highest front position. This indexing of the insert 14 in various orientations in its pocket in the cartridge 16 is repeated until all six points on the insert 14 are worn down. In the case of positive rake inserts there are only three cutting points to index rather than six. Other shaped inserts than the triangular shape shown can be used, of course. Toolholders embodying my invention are supplied in left hand and right hand toolholders and straight facing toolholders.

It will thus be seen that there has been provided by my invention improvements in indexable insert type cutting toolholders in which the object hereinabove set forth, together with many thoroughly practical advantages, has been successfully achieved. For example, the cartridge 16 is very hard and practically impossible to nick or dent and is solidly locked in place in the shank 12. The lock pin 26 is relatively short and stubby and very strong since the distance between the pressure and fulcrum points thereon is at a minimum. The loose shim of present day toolholders is entirely eliminated and the resultant force on the insert 14 tends to force it both downwardly and rearwardly into the rear of the pocket of the cartridge 16. The shank 12 is protected by the relatively thick and heavy bodied, solidly fastened, tough and relatively hard cartridge 16 which retains its hardness as the tool heats up in use at high cutting speeds. The upstanding raised portion at the rear of the cartridge 16 which accommodates the fasteners 18 permits the use of larger diameter and hence stronger fasteners and actually strengthens the floor portion which accommodates the lock pin 26 by keeping said floor portion free of other fasteners than said lock pin 26.

While a preferred embodiment of my invention has been shown and described, it is to be understood that variations and changes may be resorted to without departing from the spirit of my invention, as defined by the appended claims.

What I claim is:

1. In an indexable insert type cutting tool holder having a steel shank and a pocket in said shank for carrying an indexable insert therein, the pocket being defined by floor and wall surfaces, the floor being formed at a predetermined rake angle with respect to the orientation of the shank, and the wall surface being essentially perpendicular to the floor, and said insert having a plurality of peripheral cutting edges and a central aperture therein by which it is held in place in said toolholder the improvement of a cartridge fitted in the pocket in said shank, the cartridge including a bottom wall surface and a rear face which are respectively in abutment with essentially the entirety of the floor and face surfaces in the pocket of the shank in order to shield such pocket surface from nicks and dents, the cartridge further including a step in its upper surface defining a pocket to receive the insert and an enlarged head portion extending away from the pocket floor surface of the shank at a direction essentially perpendicular thereto, the enlarged head including an aperture therethrough mating with a threaded aperture in the floor of the shank pocket, and a retainer member extending through the head aperture and being threadedly received in the floor aperture to secure the cartridge in position; said cartridge being formed of a high speed steel harder than that of said shank but less than that of said insert, said cartridge retaining its hardness even when heated to cherry red heat, and means for fastening said insert securely in place in said cartridge pocket, including a threaded fastener extending through the central aperture of the insert and into both a mating fastener aperture in the cartridge and a mating fastener aperture in the shank, the cartridge aperture including a frusto-conical countersink in the pocket adjacent the insert, with the countersink being offset toward the enlarged head with respect to the center of the remainder of the fastener aperture in the cartridge, and the threaded means for fastening the insert including a lock pin having an enlarged major head portion in engagement with the central apertured portion of the insert and an intermediate enlarged frusto-conical portion which engages the countersink in the cartridge, with the cartridge countersink providing a fulcrum point adjacent the insert to reduce the lever arm between such fulcrum point and the region of contact between the insert and the major head portion.

2. The improvement defined in claim 1, wherein the major head portion of the lock pin is tapered, with the taper on said head being such that the same is widest at its top surface, said tapered head exerting a rearwardly and downwardly acting holding force upon said insert when said lock pin is tightened, whereby said insert is forced both rearwardly and downwardly into the pocket in said cartridge.

* * * * *